US005781749A

United States Patent [19]

Le Quere

[11] Patent Number: 5,781,749
[45] Date of Patent: Jul. 14, 1998

[54] CONTROLLER FOR MULTIPLE DATA TRANSFER BETWEEN A PLURALITY OF MEMORIES AND A COMPUTER BUS

[75] Inventor: Patrick Le Quere, Villebon sur Yvette, France

[73] Assignee: Bull S.A., France

[21] Appl. No.: 683,047

[22] Filed: Jul. 15, 1996

Related U.S. Application Data

[63] Continuation of Ser. No. 244,892, filed as PCT/FR92/01202, Dec. 17, 1992 published as WO93/12485, Jun. 24, 1993, abandoned.

[30] Foreign Application Priority Data

Dec. 19, 1991 [FR] France ................... 91 15814

[51] Int. Cl.[6] .................................... G06F 13/38
[52] U.S. Cl. ............................................ 395/309
[58] Field of Search .......................... 395/280, 290, 395/309, 310

[56] References Cited

U.S. PATENT DOCUMENTS

| | | | |
|---|---|---|---|
| 4,881,167 | 11/1989 | Sasaki et al. | 364/200 |
| 5,367,646 | 11/1994 | Pardillos et al. | 395/325 |
| 5,386,524 | 1/1995 | Lary et al. | 395/400 |
| 5,408,644 | 4/1995 | Schneider et al. | 395/575 |

FOREIGN PATENT DOCUMENTS 0398178  5/1990  European Pat. Off.

OTHER PUBLICATIONS

IBM Technical Disclosure Bulletin vol. 32, No. 1, Jun. 1989, Armonk, NY, US. pp. 396–404, "Simultaneous Dual–Port Direct Memory Access Transfers".

*Primary Examiner*—Glenn A. Auve
*Attorney, Agent, or Firm*—Kerkam, Stowell, Kondracki & Clarke, P.C.; Edward J. Kondracki

[57] ABSTRACT

A controller (CTMI) for multiple transfer of data organized by a microprocessor (MPU) between a plurality of memories (SRAM, VRAM) and a computer bus (PSB), including a plurality of registers (REGI, REGO) programmed by the microprocessor for writing into them of information enabling the organization of the transfer over a first and a second channel. The controller includes a central bus (BC, BC1) connected to each of the registers; a first and a second channel controller, associated with the first and second channel, respectively; and an arbitration device connected on the one hand to the second interface and on the other to each of the channel controllers. The arbitration device allocates a given channel to the data routes going to the memories or the microprocessor. The channel controllers control, for each channel, the writing access of the microprocessor to the registers associated with that channel and the transfer of data to each of the memories.

3 Claims, 6 Drawing Sheets

| 7 | 6 | 5 | 4 | 3 | 2 | 1 | 0 |
|---|---|---|---|---|---|---|---|
| STR | SAB | INTE | ARCH | PTYD | ENDIAN | DBK | HP |

FIG. 6

| | 6 | 5 | 4 | 3 | 2 | 1 | 0 |
|---|---|---|---|---|---|---|---|
| COC | ACT | ERR | 0 | ERR1 | ERR0 | 0 | 1 |

FIG. 7

| 7 | 6 | 5 | 4 | 3 | 2 | 1 | 0 |
|---|---|---|---|---|---|---|---|
| 0 | 0 | 0 | 0 | BTC3 | BTC2 | BTC1 | BTC0 |

FIG. 8

| 17 | 16 | 15 | 14 | 13 | 12 | 11 | 10 | 9 |
|---|---|---|---|---|---|---|---|---|
| MTC17 | MTC16 | MTC15 | MTC14 | MTC13 | MTC12 | MTC11 | MTC10 | MTC9 |

| 8 | 7 | 6 | 5 | 4 | 3 | 2 | 1 | 0 |
|---|---|---|---|---|---|---|---|---|
| MTC8 | MTC7 | MTC6 | MTC5 | MTC4 | MTC3 | MTC2 | 0 | 0 |

FIG. 9

| 20 | 19 | 18 | 17 | 16 |
|---|---|---|---|---|
| BAR20 | BAR19 | BAR18 | BAR17 | BAR16 |

| 15 | 14 | 13 | 12 | 11 | 10 | 9 | 8 |
|---|---|---|---|---|---|---|---|
| BAR15 | BAR14 | BAR13 | BAR12 | BAR11 | BAR10 | BAR9 | BAR8 |

| 7 | 6 | 5 | 4 | 3 | 2 | 1 | 0 |
|---|---|---|---|---|---|---|---|
| BAR7 | BAR6 | BAR5 | BAR4 | BAR3 | BAR2 | 0 | 0 |

FIG. 10

CONTROLLER FOR MULTIPLE DATA TRANSFER BETWEEN A PLURALITY OF MEMORIES AND A COMPUTER BUS

This is a continuation of application Ser. No. 08/244,892, filed as PCT/FR92/01202, Dec. 17, 1992 published as WO93/12485, Jun. 24, 1993 now abandoned.

FIELD OF THE INVENTION

The present invention relates to a controller for multiple transfer of data organized by a microprocessor between a plurality of memories, at least one of which is associated with the microprocessor, and a computer bus to which the controller is connected. It is applicable more particularly to a universal device for coupling a computer bus to a controller of a group of peripherals or terminals that are connected to one another by a specific link to which the controller is physically connected. This link may be that of a token ring data transmission network of the FDDI type, in which the transmission carrier is embodied by fiber optics, or a link of the SCSI type connecting magnetic disk memories to one another. Both the FDDI and the SCSI types of links are standardized by both ANSI (American National Standards Institute) and ISO (International Standards Organization).

BACKGROUND OF THE INVENTION

One such universal coupling device is known. It is described in French Patent Application 91.08908, filed by the assignee of the present invention on Jul. 15, 1991 and entitled "Dispositif universel de couplage d'un bus d'ordinateur à un contrôleur d'un groupe de périphériques", corresponding to U.S. patent application Ser. No. 07/913,477, filed Jul. 15, 1992 (U.S. Pat. No. 5,367,646), for Universal device for coupling a computer bus to a controller of a group of peripherals.

In order to better understand how the multiple data transfer controller of the invention is constituted and how it functions, it will be useful to recall what the essential constituent elements of the universal coupling device described in the aforementioned application are, it being understood that the description of that application is hereby incorporated by reference into the present description.

Turning to FIG. 1, this shows what the essential constituent elements of the universal coupling device in question are.

The computer bus is the parallel-type bus PSB, for instance embodied by a MULTIBUS II (Trademark filed by Intel Corporation), normally under IEEE Standard 1296 (IEEE stands for Institute of Electrical and Electronic Engineers). This bus connects the various constituent elements of the computer to one another (central processor or input/output processors, memories, etc.).

The essential constituent elements of the universal coupling device GPUI are as follows:

- the coprocessor MPC (for example type VL82c389 made by Intel), which acts as an interface with PSB,
- the microcontroller MIC, which supports the interconnect function of the MULTIBUS II (also defined by IEEE Standard 1296),
- the microprocessor MPU, which is in fact the central processing unit of the GPUI, is provided with its internal bus BI, and is associated respectively with an erasable programmable memory $EPROM_1$, a read/write memory SRAM, and an interrupt manager, that is, MFP. The elements $EPROM_1$, SRAM, MFP are all connected to the internal bus BI of the microprocessor MPU,

- the dual-port video RAM type of memory, designated by the letters VRAM,
- the logical isolation elements $FLI_1$ and $FLI_2$,
- the direct memory access controller DMAC, connected to the bus $B_2$ that connects VRAM to the coprocessor MPC.

The dual-port memory (VRAM) is connected by the way of a bus ($B_1$) to an interface (IHA) that connects the universal coupling device GPU to a controller DEA of a group of peripherals or terminals, and this controller is in turn connected to this specific link.

A description of this controller DEA and of the interface IHA may be found in French Patent No. 2 650 412 corresponding to U.S. Pat. No. 5,237,659, filed by the assignee of the present invention on Jul. 27, 1989.

The bus BI of the computer is also connected to the interface IHA.

The object of the universal coupling device is the transfer of data of frames sent by the computer ORD that contains the bus PSB to the specific link, by way of the controller DEA, and in turn, to realize the adaptation and management of the various transmission protocols used both on the bus PSB and by the computer ORD and by said link. The universal coupling device GPUI then transfers the data from PSB to the interface IHA and vice versa, while at the same time working on adapting the protocols and outputs between the bus PSB and the specific link (FDDI, SCSI, etc.).

The microprocessor MPU is a 32-bit microprocessor with a 25 MHz clock speed. It manages the internal bus BI, which is a non-multiplexed bus with 32 data bits and 32 address bits.

The read only memory $EPROM_1$, with a capacity of 128 or 256 kilobytes contains the self-test and initializing programs of the coupling device GPUI; the operating system GPOS of the microprocessor MPU is contained in the static memory SRAM. This memory has a capacity of 512 kilobytes or 1 megabyte.

The operating system GPOS organizes the operation of the entire microprocessor, and consequently it supervises the transfer of frames from PSB to the interface IHA and vice versa. One example of an operating system GPOS is described in French Patent Application 91.08907, filed by the present applicant on Jul. 15, 1991, and entitled "Système d'exploitation pour dispositif universel de couplage d'un bus d'ordinateur à une liason spécifique d'un réseau", corresponding to U.S. patent application Ser. No. 07/913,366, filed Jul. 15, 1992 (U.S. Pat. No. 5,455,950), for Operating system for universal device for coupling a computer bus to a specific link of a network.

The program for adapting protocols used on the one hand between the computer ORD and the coupling device via the bus PSB, and on the other in the network employing the specific liason (FDDI, SCSI, etc.), is contained in the memory SRAM.

The microprocessor MPU is the brain of the coupling device, because it initializes the transfer of data, performs adaptation of the protocols, executes its code, and transfers the useful data between DEA and the computer ORD and vice versa, all while in dialog with DEA, with which it exchanges commands and conditions, for example in the manner described in the aforementioned French Patent No. 2 650 412.

Accordingly, the data transfer between the interface IHA and the memory VRAM on the one hand, and between the latter and the bus PSB via MPC on the other, is organized by the microprocessor MPU, this latter transfer being performed under the control of the direct memory access circuit DMAC. The conversion of specific control blocks of the protocols used in the computer bus into those used in the link and vice versa is done by the microprocessor, which assures their transfer over its internal bus BI to or from the linking interface IHA.

The elements $FLI_1$ and $FL_2$ prevent the transfer of useful data between the bus $B_2$ and the bus BI, and between the bus $B_1$ and the bus BI.

The direct memory access controller DMAC assures the transfer of useful data between the coprocessor MPC and one of the memories, SRAM or VRAM. It has two channels:

one channel called "in channel" or input channel, which assures the transfer of useful data from the coprocessor MPC to the memory VRAM or SRAM.

one channel called "out channel" or output channel, assuring the transfer of data from VRAM (or SRAM) to the coprocessor MPC.

To perform a data transfer, the controller DMAC receives a starting address (either in the memory VRAM or in the coprocessor MPC), a count, in other words the number of bytes to be transferred, and a starting order for the transfer of the data, from the microprocessor MPU. As soon as it has received this information from the MPU, DMAC organizes this transfer of useful data. It is accordingly slaved to the MPU for the information that provides the address and the count. The controller DMAC does not see the data that pass from the memory to the coprocessor and vice versa (obviously, the same is true for the passage of data from MPC to SRAM and vice versa). It controls only the routing on demand by the MPU.

OBJECTS OF THE INVENTION

The object of the present invention is in a single chip to integrate not only all the elements that assure the DMAC functions but also the FLI1 element and some of the servant elements of the coprocessor MPC, by adding novel functions that GPUI, for instance, does not possess, the array chaining (or descriptor chaining) mode described in detail hereinafter, and the use of one or the other of the transmission modes known as "little endian" or "big endian" (see hereinafter).

In the present invention the direct memory access controller is connected in series between one or the other of the two memories SRAM, VRAM and the coprocessor, in such a way that the direct memory access controller, also called a multiple transfer controller, will be traversed directly by the data routes.

According to the invention, the controller for multiple transfer of data, organized by a microprocessor between a plurality of memories, at least one of which is associated with the microprocessor, and a computer bus to which the controller is connected by a specific interface of the latter, the transfer being effected over a first data output channel, and a second data input channel, including a plurality of registers programmed by the microprocessor for the writing into them of information enabling the organization of each transfer over each of the first and second channels, is characterized in that:

it includes a central bus connected on the one hand to said interface and on the other to the bus of the microprocessor and to each of the memories, each of registers associated with a channel being connected to this central bus, a first and a second channel controller associated with the first and second channel, respectively, and connected to each of the registers associated with that same channel, an arbitration device connected on the one hand to the bus of the microprocessor and on the other to each of the two channel controllers, the arbitration device, which arbitrates the allocation of each of the two channels to the data route going to the various memories or the microprocessor in accordance with predefined priorities, the channel controllers for each channel controlling on the one hand writing access of the microprocessor to the registers associated with that channel and on the other transfer of data in direct memory access to each of said memories.

BRIEF DESCRIPTION OF THE DRAWINGS

Further characteristics and advantages of the present invention will become apparent from the ensuing description given by way of nonlimiting example, in conjunction with the accompanying drawings.

In these drawings:

FIGS. 6–11 in detail show the internal structure of each of the registers associated with each channel, belonging to the multiple transfer controller according to the invention;

DETAILED DESCRIPTION OF THE PREFERRED EMBODIMENTS

Figure 1:
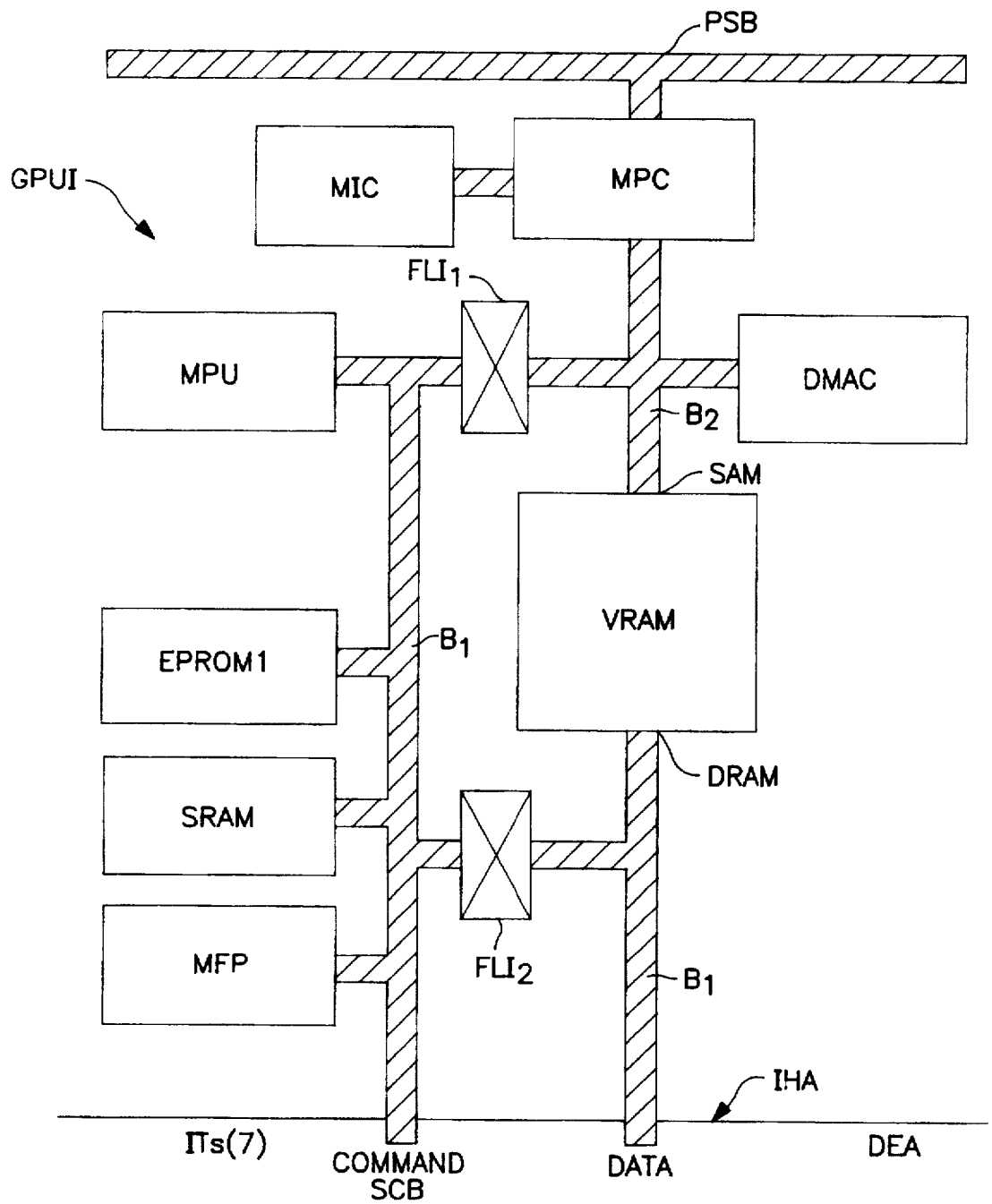
FIG. 1 illustrates how a universal coupling device including a multiple transfer controller is constituted in the prior art.
Figure 2:
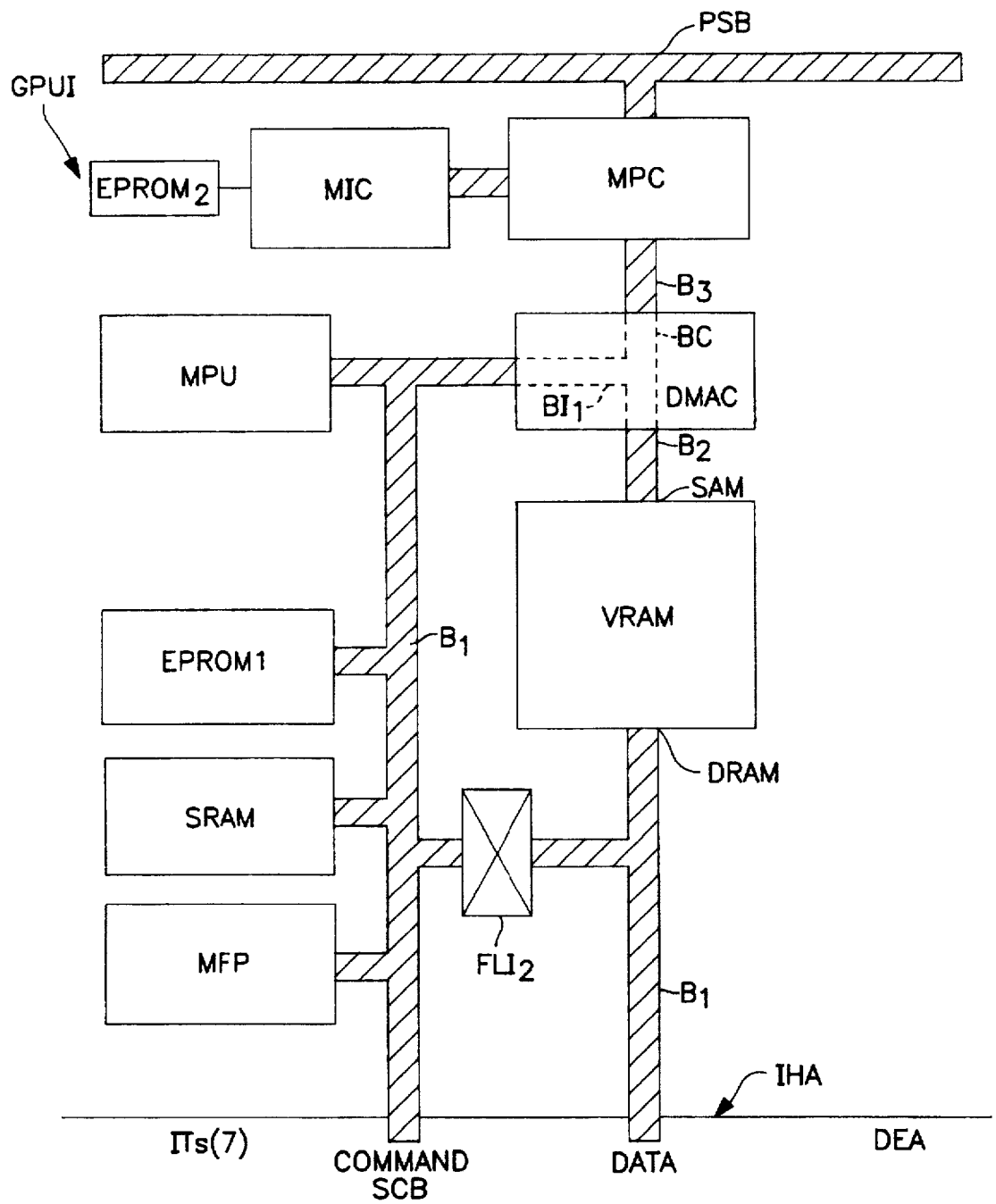
FIG. 2 shows the various essential constituent elements of a universal coupling device that integrates the multiple transfer controller of the invention.

Turning to FIG. 2, an improvement in the universal coupling device GPUI of FIG. 1 is shown, which employs the multiple transfer controller according to the invention.

As can be seen in this same figure, the multiple transfer controller according to the invention, that is, CTMI, is connected in series between the dual-port memory VRAM and the coprocessor MPC, on the one hand, and between the internal bus BI of the microprocessor MPU and this same coprocessor MPC, on the other. For that purpose, the multiple transfer controller CTMI includes an internal bus with two branches, one branch BC making it possible to connect the memory VRAM to the processor MPC and the other branch, $BC_1$, making it possible to connect the internal bus BI of the microprocessor to the coprocessor MPC. The internal bus BC of CTMI is connected to a bus $B_2$ that in turn is connected to the second port SAM of the memory VRAM. In addition, BC is connected to a bus $B_3$ that in turn is connected to the coprocessor MPC.

Because of the series connection of the controller CTMI between MPC and VRAM and between MPC and SRAM, this controller functions by what is known as the "fly-by mode", also called single cycle, which means that the useful data are transferred directly between one or the other of the memories VRAM or SRAM and the coprocessor MPC, without ever being stored inside the controller, the stream of useful data passing directly through the controller by way of one or the other of the two branches of the internal bus, in other words either BC or $BC_1$.

This controller, like the controller DMAC of FIG. 1, includes two channels of the DMA type (direct memory access in English), that is, an input channel "in" and an output channel "out". The data speeds inside the controller CTMI can reach as much as 32 megabytes per second, and this controller can operate in two different modes, that is, the normal mode and the mode known as array chaining. In the normal mode, the data are transmitted in the form of successive packets of data in the form of 32-bit words. MPU then writes the address in memory VRAM (or SRAM) of each data packet that is then to be written or read in it, and its length (also called its count), that is, the number of 8-bit bytes that the data packet to be transmitted contains, into one of the registers of CTMI. Having received these indications in the register involved, the controller CTMI then writes or reads the information in one or the other of the two memories in question. It can be seen that in this mode, CTMI is the slave of the microprocessor MPU. Conversely, in what is known as the array chaining mode, the microprocessor indicates only to the controller CTMI the address and count of the first data packet to be transmitted, these indications also being written in one of the registers of the controller. With respect to the data packets that follow the first one, the controller CTMI itself searches for the address and count relating to them in a table of descriptors containing this information, the table being contained in the memory SRAM and a given descriptor being associated with a predetermined data packet. In this mode, up to 15 successive data packets can be transmitted. Just before the transfer of these packets, the microprocessor MPU tells CTMI what the first descriptor is and how many descriptors are involved in the transfer.

Like the controller DMAC in FIG. 1, the controller according to the invention gives the highest priority to the input channel (transfer of data from the coprocessor to one or the other of the two memories). It can interrupt the output channel when that channel is working (transferring data from one or the other of the two memories to the coprocessor), at the end of a transfer of a data packet, or can suspend it for the entire data transfer, in other words the transfer of all the data packets involved.

A channel is said to be active when it is ready to perform a transfer of data from or to the coprocessor: this means that as soon as the coprocessor makes a DMA transfer request, the corresponding channel (input or output) can perform the transfer.

In the language of one skilled in the art, when the two input and output channels are simultaneously active, it is said, in a misuse of language, that a simultaneous transfer is taking place, although this does not mean that the data on each of them are physically transferred at the same time on the data buses $B_2$, BC, $B_3$ (the physical transfer of the data is temporally multiplexed by the multiplexer MULT; see hereinafter).

When the memory VRAM is made up of a single memory bank, a simultaneous transfer can take place over each of the two channels, but it is then accompanied by a loss of performance; in fact, any interruption of one channel by another involves the necessity of knowing the context of the transfer that was in progress on the interrupted channel.

This is not the case when the memory VRAM is made up of two separate memory banks (for instance, two separate memory banks each with a capacity of 1 MB). Then any simultaneous transfer causes no loss of performance whatever (there is no need to know the context).

In a preferred mode of the invention, the controller CTMI includes one parity bit generation for each data packet transfer and for parity control.

In addition, the controller CTMI supports one or the other of the information transmission modes known as "little endian" or "big endian", defined by the respective vendors Intel and Motorola. Each of these modes consists of defining the order in which the bits of the eight-bit bytes are transmitted over time, that is, whether they are transmitted from the most significant to the least significant bits, or vice versa. The adaptation of the controller of the invention to one or the other of the two transfer modes, "little endian" or "big endian", signifies that if this controller receives information over PSB in one of the modes, for instance originating from an 80386 Intel-type microprocessor, then it is capable of performing the conversion between the "little endian" mode of the latter and the "big indian" mode included in the microprocessor MPU, if the latter is of the Motorola type, for example the 68030 type (as is the case in the preferred exemplary embodiment of the coupling device GPUI of FIG. 2).

Figure 3:
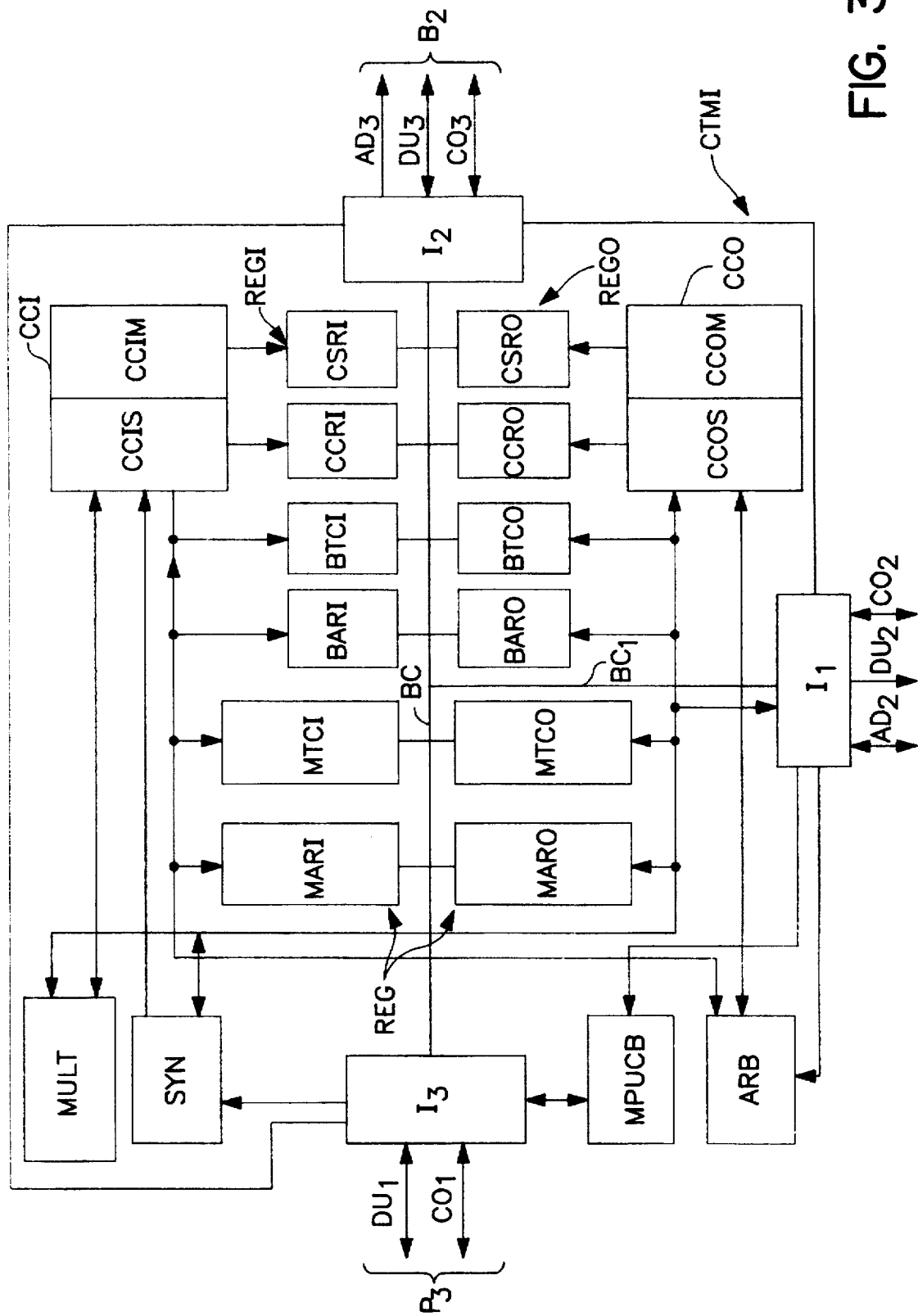
FIG. 3 shows the various essential constituent elements of the multiple transfer controller according to the invention.

All the constituent elements of the controller CTMI according to the invention, which are shown in FIG. 3, are disposed on the same semiconductor component, also known as a chip.

These main elements are as follows:

the set of six registers associated with the input channel, that is, the registers MARI, MRCI, BARI, BTCI, CCRI, CSRI;

the set of six registers associated with the output channel, that is, the registers MARO, MRCO, BARO, BTCO, CCRO, CSRO;

the input channel controller CCI;

the output channel controller CCO;

the arbitration device ARB for arbitrating access conflicts in the various data routes, going to or coming from the two memories VRAM, SRAM, in accordance with the predefined priorities;

the device for synchronizing the various signals entering or leaving the multiple transfer controller CTMI, that is, the device SYN;

the multiplexer MULT, for temporally multiplexing the data packets addressed from one or the other of the two input and output channels to one or the other of the two memories VRAM, SRAM;

the device for managing access of the microprocessor to the coprocessor MPC, that is, the device MPUCB;

the internal buses BC and $BC_1$;

the respective interfaces of the controller CTMI with the coprocessor, the memory VRAM and the microprocessor by way of the buses $B_3$, $B_2$, BI, these interfaces being identified by the respective symbols $I_3$, $I_2$ and $I_1$.

The interface $I_3$ (see FIG. 3) receives useful data $DU_1$ and command information (write/read) $CO_1$, going from the coprocessor MPC to the multiple transfer controller CTMI and vice versa.

The interface $I_1$ receives useful data $DU_2$, addressing information $AD_2$ and command information $CO_2$, going to or coming from the microprocessor MPU.

The interface $I_2$ receives useful data $DU_3$, addressing information $AD_3$ and command information $CO_3$, going to or coming from the memory VRAM.

The set of registers associated with the input channel is identified by the symbol REGI, while the set of registers associated with the output channel is identified by the symbol REGO.

Both the set REGI and the set REGO contain information enabling the controller according to the invention to transfer useful data packets over one or the other input or output channels to one or the other of the two memories VRAM or SRAM, or to the coprocessor MPC. More-detailed description of each of the registers making up one or the other of the two sets REGI, REGO will be provided hereinafter in conjunction with FIGS. 6–11.

The input channel controller CCI is in fact made up of two parts, one called the slave condition machine, here identified by the symbol CCIS, and the other called the master condition machine, here called CCIM.

The slave condition machine CCIS manages the accesses for writing by the microprocessor MPU to all the registers of the corresponding channel, in other words the registers belonging to REGI. Furthermore, it performs error indication management in the register CSRI (see detailed description hereinafter).

The master condition machine CCIM manages all the operations consisting of searching for the information in the descriptors contained in the memory SRAM when the array chaining mode is employed. In addition, whether the normal mode or the array chaining mode is involved, it outputs the command signals (writing/reading) both for the coprocessor MPC and for one or the other of the two memories SRAM or VRAM. This same machine CCIM also manages updating of the address registers and counting registers of REGI.

This same machine CCIM also performs the transfer of pages of useful data to the memory VRAM. It is known that in fact writing (as well as reading) in the memory VRAM is done page by page, and line by line for each page (see the aforementioned U.S. Pat. No. 5,367,646). The transfer of pages of useful data to the memory VRAM organized by the master condition machine CCIM meets the conditions stated in the specification sheet on the corresponding video RAM, such as the sheet for the Toshiba video RAM TC524256, type Z-10.

The output channel controller CCO is actually divided into two parts, that is, a slave condition machine CCOS and a master condition machine CCOM.

The slave condition machine CCOS manages all the accesses of the microprocessor MPU to all the registers of the corresponding channel, that is, those of the set REGO. In addition, it performs the error indication management in the register CSRO (see hereinafter).

The master condition machine CCOM manages the operation consisting of searching for the information in the descriptors contained in the memory SRAM, in the case where operation is in the array chaining mode, and it also manages the operations of DMA-type transfers (both in the normal mode and in the array chaining mode), that is, the generation of command signals for the coprocessor MPC and one or the other of the two memories SRAM or VRAM, as well as updating of the address and counting registers in the set REGO.

The page transfer from the memory VRAM is also done by way of this master condition machine CCOM, under the conditions defined in the technical manual for the VRAM memory, such as the aforenoted Toshiba reference TC524256.

Turning now to the MPUCB element:

This element manages the access of the microprocessor to the coprocessor MPC. In this case, the microprocessor in fact delegates its powers to the controller CTMI, through MPUCB. The latter performs the generation of data transfer acknowledgement signals for MPU, which are also known by their English acronym DSACK (for data transfer acknowledge, signals specific to the Motorola 68030 microprocessor). It should be stated that the functions accomplished by the element MPUCB were performed by the microprocessor MPU itself in the universal coupling device of FIG. 1.

Figure 5:
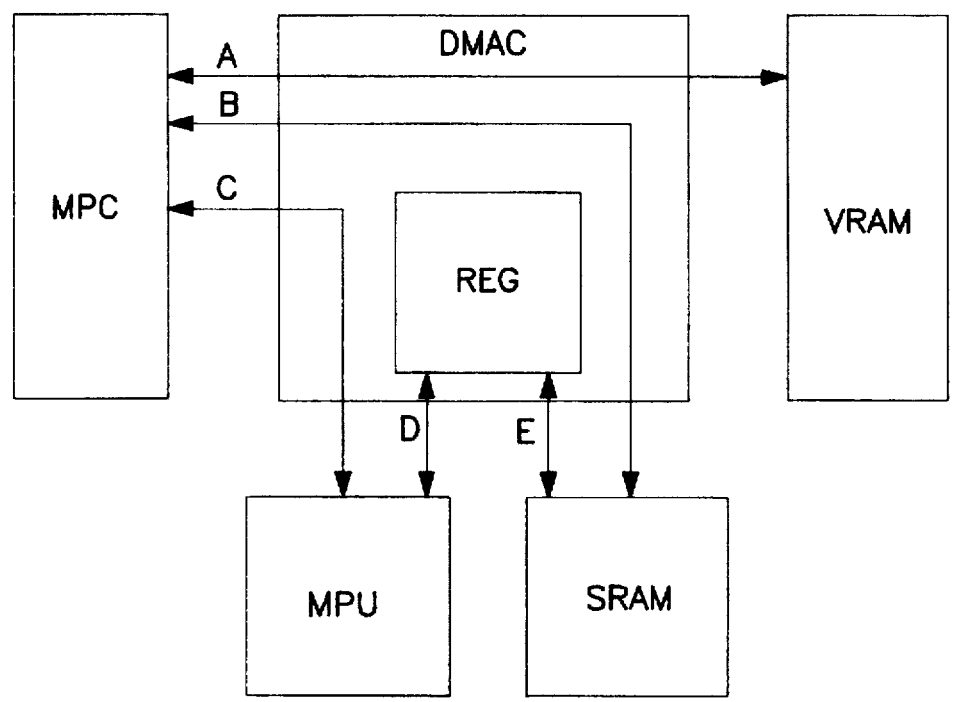
FIG. 5 shows what the various data routes are that pass through the multiple transfer controller according to the invention.
Figure 4:
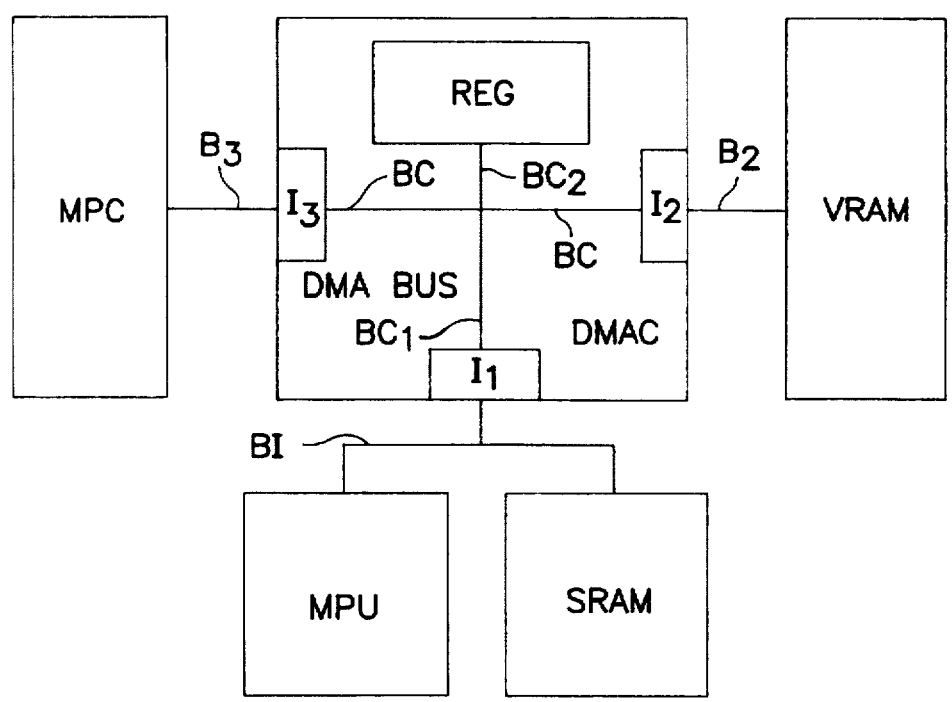
FIG. 4 in detail shows the structure of the internal bus of the multiple transfer controller according to the invention.

Turning now to FIGS. 4 and 5, these make it possible to better comprehend the operation of the arbitration device ARB.

The device ARB is responsible on the one hand for assigning a predetermined data route to the entity requesting it, this latter being one or the other of the two input or output channels or the microprocessor, and on the other hand is tasked with solving conflicts that can arise when simultaneous demands are made by different elements (for example, by the microprocessor and the coprocessor on one or the other of the two channels). The various data routes employed are shown in FIG. 5. Physically, they are supported by the physical structure shown in FIG. 4 and makes use of one or the other of the two branches BC or BC1. BC being connected to the interfaces $I_3$ and $I_2$ and BC1 being the derived branch connected to BC on the one hand and $I_1$ on the other. This same FIG. 4 shows that physically, the entire register REG is connected to the main branch BC by a secondary branch of bus $BC_2$. The internal physical structure of the buses BC, $BC_1$ and $BC_2$ is identical.

If one turns to FIG. 4, one can see the various possibilities that the arbitration device must take into account before making its decision. The various data routes are in fact as follows:

Data route A carries the data from the coprocessor MPC to the memory VRAM, over the bus BC. For this data route, CTMI conducts the operations. In other words, it is the master of the transfer.

Data route B carries the data from the coprocessor to the memory SRAM and vice versa through BC and then $BC_1$ and the internal bus BI. For this data route, the controller CTMI is the master.

Data route C consists of writing or reading the registers of the coprocessor MPC. For this route, the microprocessor MPU is the master.

Data route D is the one that consists of reading or writing the registers of the set REG (REGI+REGO). For this route, the microprocessor MPU is the master.

Data route E consists of searching for the data in the table of descriptors in the memory SRAM. For this data route, the controller CTMI is the master.

With respect to the data routes D and E, it is clear that the physical route taken is $BI+BC_1+BC_2$.

The accesses to certain data routes are in conflict. This is true for data routes A and B, or for A and C. The accesses to the data routes A and D or A and E are also in conflict. Other accesses are exclusive from one another. This is true for C and D, or for B and E. As a function of what has just been described, the essential characteristics of the arbitration scheme carried out by the device ARB are as follows:

The input channel has a higher priority than the output channel;

a DMA-type of request that is in progress on the input channel while the output channel is active takes priority over the latter, and the output channel must release the bus (BC, BC1) as soon as possible;

when page transfers to or from the dual-port memory VRAM are in progress, and even though there is no data transfer activity on the bus BC of CTMI, this latter nevertheless remains active, because the serial port of the memory VRAM is still involved in the transfer;

the accesses by the microprocessor MPU to the internal buses (BC, BC$_1$) of the controller CTMI have to wait until the bus is free.

Turning now to FIGS. 6–11:

FIG. 6 shows the contents of one or the other of the two registers CCRI or CCRO (the various bits that they contain have an identical significance regardless of the channel).

It can be seen that the channel control register CCRI (or CCRO) contains eight bits, that is, STR, SAB, INTE, ARCH, PTYD, INDIAN, DBK, and HP. The meaning of each of these bits is as follows, knowing that the general purpose of this channel control register CCRI (or CCRO) is to provide the necessary parameters to the channel control device CCI (or CCO) telling it how it is to operate (normal, chaining array, big endian or little endian mode, etc.).

The bit STR (standing for start channel) is set to 1 by the microprocessor, in order to activate the corresponding channel (input channel for CCRI, output channel for CCRO). To be able to set this bit to 1, it is necessary for the four registers BARI, BTCI, MARI and MTCI, that is, address and counting registers, are at that time programmed. The request for use of the channel DMA by the coprocessor MPC can then be acknowledged. This means that the latter sends an acknowledgement signal to the corresponding channel control device CCI (or CCO). An error may occur when several condition are met while the same bit STR is equal to 1. This can occur for instance when the contents of the counter MTC (see hereinafter) is zero while at the same time the contents of the bit ARCH are zero (this meaning in that case that the array chaining mode is not employed). This can also happen when the bit SAB is equal to 1 (see the meaning of SAB hereinafter), or that the channel in question is at that time active, or again that the transfer over the channel has just been completed. This can occur again if the contents of the register BTCI are zero while the array chaining mode is employed (see description of the register BTCI below).

When there is an error, an error bit is set to 1 in the register CSRI (see hereinafter, at the same time as the significance of the error is indicated in this same register). In that case, an interrupt is sent to the microprocessor if the bit INTE contained in CCRI (or CCRO) is equal to 1. If there is an error, then the other bits of this same register are then not written and remain unchanged.

The bit SAB, when it is set to 1 by the microprocessor MPU, means that the latter gives the order to make the corresponding channel inactive, thus blocking any transfer immediately after the last word of the last packet has been transferred to the desired location (in VRAM, SRAM or MPC). In this case, the bit ERR contained in the register CSRI or CSRO is set to 1 at the same time as an indication is made therein that an order of the microprocessor to make the corresponding channel inactive is involved.

The bit INTE, when it is set equal to 1 by the microprocessor MPU, means that any interruption whether in progress or not is validated on the corresponding channel. The value of this bit cannot be changes unless the corresponding channel is inactive (bit ACT=0 in the register CSRI or CSRO).

The bit ARCH, also set to 1 by the microprocessor MPU, validates the use of the array chaining mode for a DMA-type transfer over the corresponding channel. When this bit is equal to zero, the normal mode is used. The value of this bit cannot be changing unless the corresponding channel is inactive (ACT=0, see hereinafter).

The PTYD, used only on the output channel, set equal to 1 by the microprocessor, invalidates the parity control for the data transfers between the memory VRAM and the coprocessor. When this bit is equal to zero, the parity control is validated. This bit cannot be changed unless the corresponding channel is inactive (ACT=0).

The bit ENDIAN set to 1 by the microprocessor MPU means that the "big endian" mode is selected for the data transfers between one or the other of the two memories SRAM or VRAM and the coprocessor. When this bit is equal to zero, the "little endian" mode is selected. It may be noted that one of the two channels can run in the big endian mode while the other runs in the opposite mode. The value of this bit ENDIAN cannot be changed unless the channel is inactive.

The bit DBK (which is the abbreviation for dual bank mode) is utilized only for the transfer to the dual-port memory VRAM. It is set equal to 1 by the microprocessor with a view to assigning one separate memory bank to each channel. If this bit DBK is equal to zero, this means that operation is in the single bank mode; in other words, data can be transferred to only a single channel at a time.

The bit HP defines what is known as a high priority mode, which can be used only over the input channel, since the output channel is then blocked (a blocked channel is an active channel whose DMA requests coming from the coprocessor MPC are masked or blocked, so that it does not see the demands and cannot respond to them). In this high priority mode, the bit HP is set equal to 1 by MPU.

If HP is equal to zero, operation is in the normal mode.

Turning to FIG. 7:

The input channel condition register CRSI (CSRO for the output channel) indicates the operating condition of the corresponding channel and includes eight bits, which are as follows:

The bit COC (abbreviation for channel operation completed) is set equal to 1 by the corresponding channel control device CCI (or CCO) as soon as a transfer is terminated in the latter. It is then set equal to 1 when a transfer of a data packet is terminated in the normal mode, or when a transfer is terminated in the array chaining mode, or when the bit SAB is equal to 1 in CCRI (or CCRO), when there is a parity error during a transfer (only on the output channel), when there is any kind of error (for example, when the corresponding channel is active and one wishes to rewrite either CCRI or CSRI), or again when there is a counting error. If COC equals 1, an interruption is sent to the microprocessor, if the bit INTE is equal to 1.

The bit ACT set equal to 1 by the control device CCI (or CCO) means that the channel in question is active. As soon as a transfer is terminated on this channel, this bit is set equal to zero. The conditions under which a transfer is terminated are those described above, in the paragraph describing the bit COC.

The bit ERR means that an error has occurred: It is set equal to 1 by the device CCI (CCO) as soon as an error occurs, or in other words either when SAB is equal to 1 or when there is a parity error, or when an error occurs during the ongoing operation, or when there is a counting error in one of the counting registers BTCI or MTCI.

The two bits ERR0, ERR1 both indicate the type of error committed. When they are both simultaneously equal to zero, the error involved is one committed during transfer. When ERR1 is equal to zero while ERR0 is equal to 1, then a counting error has occurred, either in the register MTCI (or MTCO) or in BTCI (or BTCO).

When ERR1 is equal to 1 while ERR0 is equal to zero, a parity error is involved, and when both error bits are simultaneously equal to 1, an invalidation of the corresponding channel by the microprocessor is involved (SAB=1).

Turning to FIG. 8:

The base transfer counting register BTCI (or BTCO) is an eight bit counting register which indicates the number of descriptors on the corresponding channel in the array chaining mode. In the exemplary embodiment described here, there can be up to 15 descriptors for one transfer by this mode.

This register must be loaded with a value that is not zero in the bits whose rank is from zero to three, that is, the bits BTC0–BTC3, before the bit STR is equal to 1 in the corresponding register CCRI (or CCRO). If that is not the case, then the error bit is set equal to 1 in CSRI, and a counting error is indicated by the two bits ERR0 and ERR1. The counter BTCI is decremented by one unit each time the control device CCI loads a descriptor into the registers MARI and MTCI (descriptor whose contents have been read in SRAM). When BTCI is equal to zero, as is MTCI (see also the above description for the latter) as soon as a transfer cycle is terminated, the bit COC is set equal to 1 in the corresponding register CSRI (or CSRO). The bit ACT is then set equal to zero, and an interruption is sent to the microprocessor if it is validated.

Turning now to FIG. 9:

The memory transfer counting register, that is, MTCI (or MTCO), is an 18-bit register that indicates the length of the transfer in bytes when the normal mode is selected. In the array chaining mode, it is loaded by the corresponding channel controller CCI beginning with a descriptor in the memory SRAM. The two lowest ranking bits, that is, of rank 0 and 1, are always equal to zero. In this latter case, the counter MTCI (MTCO) counts only 32-bit words. In effect, MTCI, which counts over 16 bits, counts only every four bytes, since the bits of rank 0 and 1 are equal to zero. Then 32-bit words are indeed counted. The values that are not zero for the bits of ranks 0 and 1 are ignored.

The maximum length of a transfer in the normal mode is 256 kilobytes, minus 4, while it is two megabytes (maximum size of the RAM, in the exemplary embodiment described here) in the array chaining mode. If the contents of MTCI (or MTCO) are equal to zero when the corresponding channel is activated in the normal mode, then a counting error is indicated in CSRI (or CSRO), and an interruption is engendered. If for a given descriptor the contents of MTCI are equal to zero, a counting error is also indicated in the corresponding register CSRI or CSRO, and this takes place at the moment when the corresponding descriptor is loaded into MTCI (a descriptor cannot be loaded unless MTCI has a content equal beforehand to zero). During a transfer operation, the contents of MTCI is decremented by four each time a word is transferred (each 32-bit word containing four bytes).

Turning now to FIG. 10:

The base address register BARI (or BARO) is a 21-bit register programmed with the starting address of the table of descriptors of the corresponding channel. This register is understood to be used in the array chaining mode. These bits are designated BAR2 through BAR20, with the first two bits of rank 0 and 1 permanently remaining equal to zero. The bits BAR0–BAR6 form an address counter, while the bits BAR7–BAR20 serve to address the entire memory SRAM.

Each descriptor includes two parts, each formed of one 32-bit word (four bytes). The first contains the buffer count, that is, the length in 32-bit words of the buffer intended to be transferred to or from the memory VRAM or SRAM. The second contains the address at which this buffer is to be written or read in this same memory. In the same table, up to 16 descriptors can be addressed, only 15 of which are actually used per channel (for instance, the descriptor zero is not used). As soon as one word of a descriptor has been read in the table by the channel controller CCI, the bits BAR0 and BAR6 are incremented by four in order to point the next word. This word may be either the second word (buffer address) of the same descriptor, or the first word of the next descriptor.

Figure 11:
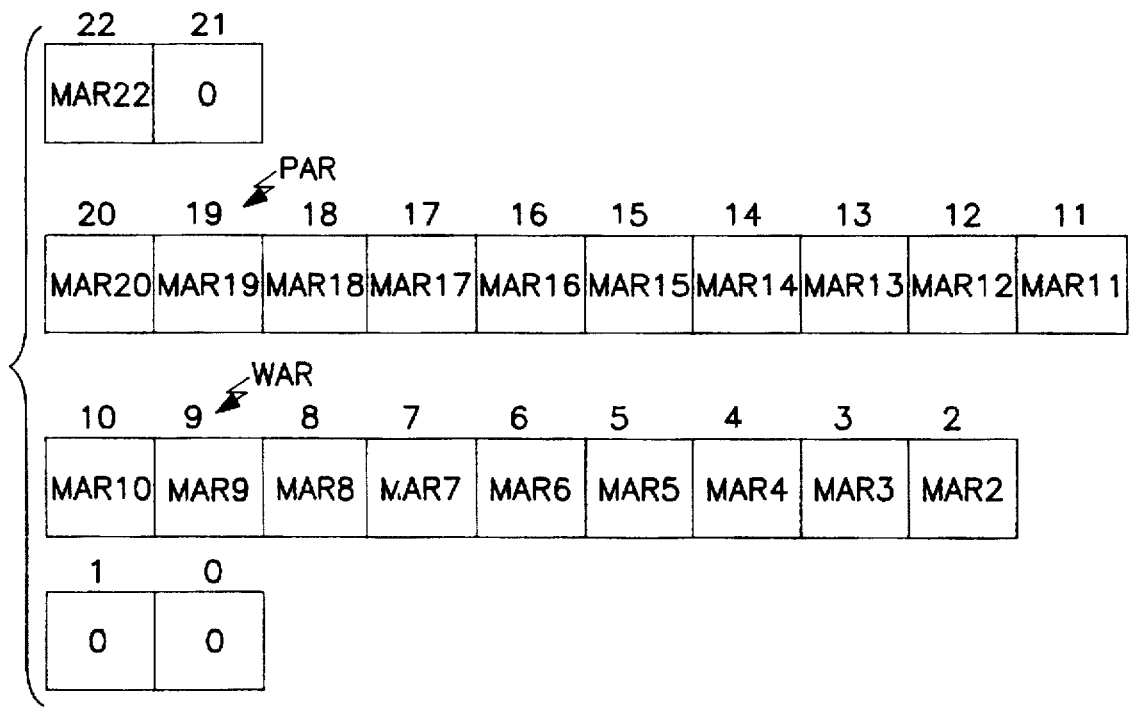

Turning to FIG. 11:

The memory address register MARI (or MATO) is a 23-bit counter register programmed with the starting address in memory VRAM of the data packet intended to be transmitted to it or received from it in the normal mode. In the array chaining mode, this register MARI (or MARO) is loaded by the channel controller CCI (or CCO) beginning at a descriptor in the memory SRAM. Hence as has been noted above, after each transfer of one word, its contents are incremented by 4. The bit MAR22 enables the channel controller CCI to distinguish between the memory VRAM or SRAM. If this latter bit is equal to zero, then the VRAM memory is involved. If it is equal to 1, the SRAM memory is involved.

Since the VRAM memory is organized in 2-kilobyte pages (see the aforementioned French patent application), the memory address register (MARI, MARO) is divided into two separate counters, that is, one word address counter PAR which is incremented upon each transfer of one word between the coprocessor MPC and the serial port of the memory VRAM, and one page address counter WAR which is incremented after each page transfer, if the preceding word address counter has zero contents. For the transfer to the memory SRAM, the two preceding counters are connected together to form a 19-bit counter. In addition, with respect to the output channel, there is only a single 19-bit counter.

Figure 12:
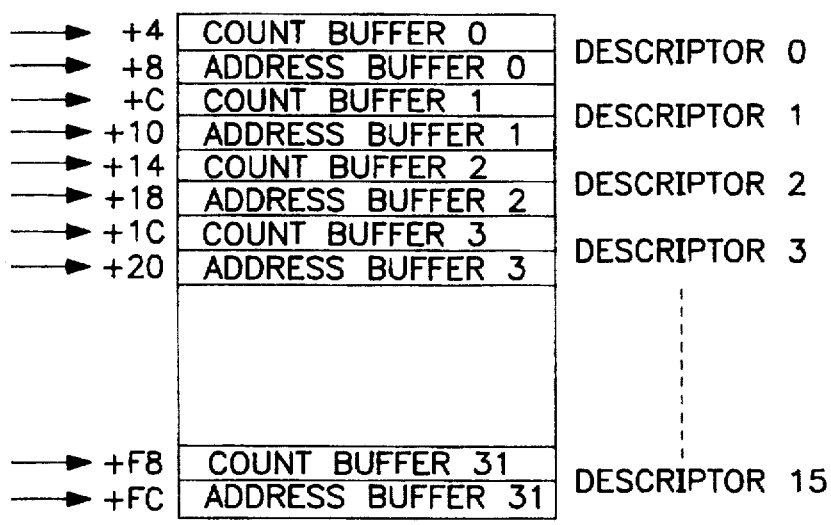
FIG. 12 shows the table of data packet descriptors found in the memory SRAM, in the case where the transfer of useful data is done by the mode known as array chaining.

Turning now to FIG. 12, this shows how a table of descriptors is constituted for a transfer in the array chaining mode. This table contained in memory SRAM includes 16 descriptors, for example, numbered from 0 to 15.

The table includes a starting address, which is the address where the first descriptor 0 is found. By convention, this first descriptor is empty. The descriptor 1 includes the count and the address that relate to the first data packet to be transferred, and so forth, up to the descriptor 15, which includes the count and the address relating to the fifteenth data packet to be transferred.

It will be recalled that each descriptor includes the count and the address relating to the data packet to be transferred that corresponds to it, to (or from) VRAM or SRAM, the count being intended to be sent to MTCI (or MTCO) and the address being meant to be sent to MARI (or MARO).

In the array chaining mode, as soon as a buffer packet is transferred, the controller CTMI, by way of its channel controller CCI (or CCO) searches for the address of the next descriptor in the table of descriptors in memory SRAM.

There is no particular constraint relating to placing the table of descriptors corresponding to a predetermined channel inside the memory SRAM, except that the descriptors of the same table must be located in succession, one after the other.

If one wishes to make a transfer, the register BARI (or BARO) is programmed with the address of the first descriptor in the descriptor table of SRAM. This register is increased by eight to obtain the address of the next descriptor. When a request DMA is sent to the multiple transfer controller, its channel controller CCI loads into MTCI the first word of the first descriptor pointed by the register BARI (or BARO), which gives the buffer count. Then the contents of BARI (or BARO) are incremented by four, and the second word of the descriptor is read by CCI in memory SRAM and loaded into the register MARI (or MARO). Accordingly, this relates to the address to which the buffer in question is to be sent or read, in memory VRAM or SRAM. Next, BARI or BARO is again incremented by four to point the next descriptor, and the register BTCI (or BTCO) is incremented by 1. The buffer count is then verified by CTMI, and so forth, if this count is not zero. In the case where it is zero, the error bits ERR are set to 1 in the register CSRI (or CSRO). The channel then becomes inactive, the bit COC being set to 1, and an interruption is sent to the microprocessor if the interruption is validated.

While the several aspects and embodiments of the invention have been illustrated and described, it will be apparent to those of ordinary skill in the art that various changes and modifications may be made without deviating from the inventive concepts and spirit of the present invention, and it is intended by the appended claims to define all such changes and modifications which come within the full scope and true spirit of the invention.

I claim:

1. A controller for multiple transfer of data packets between a plurality of memories, at least one of which is connected with a microprocessor, and a computer bus to which the controller is connected by an interface of the computer bus, said multiple transfer being effected over a first data output channel, and a second data input channel, said first and second channels being connected respectively with a first and a second set of registers said microprocessor being operable to write information in said registers which enables organization of said multiple transfer over each of the first and second channels, said controller comprising:

a central bus connected by a first interface to said interface of the computer bus and to an internal bus of the microprocessor by a second interface and to each of the memories by a third interface, said first and second set of registers being connected to said central bus;

a first and a second channel controller for controlling the first and the second channels, respectively, and connected to the first and second set of registers respectively;

means for switching data transfer between the computer bus and each of the memories according to predefined priorities, said means for switching including an arbitration device and a multiplexer;

said arbitration device being connected to the microprocessor by the second interface and to each of the channel controllers, the arbitration device functioning to arbitrate allocation of each of the channels to a data route connected to the various memories of the microprocessor in accordance with predefined priorities, the channel controllers for each channel controlling writing access of the microprocessor to the first and second set of registers, and a transfer of data in direct memory access to each of said plurality of memories;

said multiplexer being operable to temporally multiplex the data packets, said multiplexer being connected to said interface of the computer bus and to said first and second channel controllers;

wherein said controller is connected in series between said interface of the computer bus and one of said plurality of memories such that transfer of data between the interface and said one of said plurality of memories must traverse said controller;

and further wherein the first channel controller includes a slave condition machine and a master condition machine (CCIM), the slave condition machine managing writing accesses of the microprocessor to said first and second sets of registers and performing error indication management in a register connected to said first channel;

and further wherein the controller functions in the descriptor chain mode, including automatically transferring a train of n data packets one after another from and to the memories, the n data packets each having a data packet descriptor, said descriptors being written into a memory connected with the microprocessor through said internal bus;

wherein each descriptor includes two portions, a first portion including a data packet count indicating a length, corresponding to a number of binary information bits that each data packet includes, and a second portion including an address to which said data packet is to be sent; and wherein for each channel, registers connected therewith comprise:

a channel control register containing parameters required by the channel controllers that indicate a selection between a normal DMA transfer mode and in an automatic array chaining mode;

a channel condition register indicating an operating condition of the channel;

a base transfer counting register indicating a number of descriptors in the channel, when the controller is operating in the array chaining mode;

a memory transfer counting register indicating a length of the transfer of a data packet;

a base address register indicating a location in the memory (SRAM) of each descriptor when the array chaining mode is employed;

a memory address register containing an address of a location of the memory for a predetermined data packet;

a master condition machine of the first channel controller managing operations including searching for information in the descriptors, when the array chaining mode is employed; and a master condition machine of the second channel for managing operations, including searching for information in the descriptors when in the array chaining mode.

2. A controller for multiple transfer of data packets between a plurality of memories, at least one of which is connected with a microprocessor, and a computer bus to which the controller is connected by an interface of the computer bus, said multiple transfer being effected over a first data output channel, and a second data input channel, said first and second channels being connected respectively with a first and a second set of registers said microprocessor being operable to write information in said registers which enables organization of said multiple transfer over each of the first and second channels, said controller comprising:

a central bus connected by a first interface to said interface of the computer bus and to an internal bus of the microprocessor by a second interface and to each of the memories by a third interface, said first and second set of registers being connected to said central bus;

a first and a second channel controller for controlling the first and the second channels, respectively, and connected to the first and second set of registers respectively;

means for switching data transfer between the computer bus and each of the memories according to predefined priorities, said means for switching including an arbitration device and a multiplexer;

said arbitration device being connected to the microprocessor by the second interface and to each of the channel controllers, the arbitration device functioning to arbitrate allocation of each of the channels to a data route connected to the various memories of the microprocessor in accordance with predefined priorities, the channel controllers for each channel controlling writing access of the microprocessor to the first and second set of registers, and a transfer of data in direct memory access to each of said plurality of memories;

said multiplexer being operable to temporally multiplex the data packets, said multiplexer being connected to said interface of the computer bus and to said first and second channel controllers;

wherein said controller is connected in series between said interface of the computer bus and one of said plurality of memories such that transfer of data between the interface and said one of said plurality of memories must traverse said controller;

and further wherein the second channel controller includes a slave condition machine and a master condition machine, the slave condition machine managing accesses of the microprocessor to all registers connected to said second channel and performing error indication management in a register connected to said second channel;

and further wherein said controller functions in the descriptor chain mode, including automatically transferring a train of n data packets one after another from and to the memories, the n data packets each having a data packet descriptor, said descriptors being written into a memory connected with the microprocessor through said internal bus;

wherein each descriptor includes two portions, a first portion including a data packet count indicating a length, corresponding to a number of binary information bits that each data packet includes, and a second portion including an address to which said data packet is to be sent; and wherein for each channel, registers connected therewith comprise:

a channel control register, containing parameters required by the channel controllers that indicate a selection between a normal DMA transfer mode and in an automatic array chaining mode;

a channel condition register indicating an operating condition of the channel;

a base transfer counting register indicating a number of descriptors in the channel, when the controller is operating in the array chaining mode;

a memory transfer counting register indicating a length of the transfer of a data packet;

a base address register indicating a location in the memory (SRAM) of each descriptor when the array chaining mode is employed;

a memory address register containing an address of a location of the memory for a predetermined data packet;

a master condition machine of the first channel controller managing operations including searching for information in the descriptors, when the array chaining mode is employed; and a master condition machine of the second channel for managing operations, including searching for information in the descriptors when in the array chaining mode.

3. A controller for multiple transfer of data packets between a plurality of memories, at least one of which is connected with a microprocessor, and a computer bus to which the controller is connected by an interface of the computer bus, said multiple transfer being effected over a first data output channel, and a second data input channel, said first and second channels being connected respectively with a first and a second set of registers said microprocessor being operable to write information in said registers which enables organization of said multiple transfer over each of the first and second channels, said controller comprising:

a central bus connected by a first interface to said interface of the computer bus and to an internal bus of the microprocessor by a second interface and to each of the memories by a third interface, said first and second set of registers being connected to said central bus;

a first and a second channel controller for controlling the first and the second channels, respectively, and connected to the first and second set of registers respectively;

means for switching data transfer between the computer bus and each of the memories according to predefined priorities, said means for switching including an arbitration device and a multiplexer;

said arbitration device being connected to the microprocessor by the second interface and to each of the channel controllers, the arbitration device functioning to arbitrate allocation of each of the channels to a data route connected to the various memories of the microprocessor in accordance with predefined priorities, the channel controllers for each channel controlling writing access of the microprocessor to the first and second set of registers, and a transfer of data in direct memory access to each of said plurality of memories;

said multiplexer being operable to temporally multiplex the data packets, said multiplexer being connected to said interface of the computer bus and to said first and second channel controllers;

wherein said controller is connected in series between said interface of the computer bus and one of said plurality of memories such that transfer of data between the interface and said one of said plurality of memories must traverse said controller;

and further wherein the first channel controller includes a slave condition machine and a master condition machine (CCIM), the slave condition machine managing writing accesses of the microprocessor to said first and second sets of registers and performing error indication management in a register connected to said first channel;

and further wherein the second channel controller includes a slave condition machine and a master condition machine, the slave condition machine managing accesses of the microprocessor to all registers connected to said second channel and performing error indication management in a register connected to said second channel;

and further wherein the controller functions in the descriptor chain mode, including automatically transferring a train of n data packets one after another from and to the memories, the n data packets each having a data packet descriptor, said descriptors being written into a memory connected with the microprocessor through said internal bus;

wherein each descriptor includes two portions, first portion including a data packet count indicating a length, corresponding to a number of binary information bits that each data packet includes, and a second portion including an address to which said data packet is to be sent; and wherein for each channel, registers connected therewith comprise:
- a channel control register containing parameters required by the channel controllers that indicate a selection between a normal DMA transfer mode and in an automatic array chaining mode;
- a channel control register containing parameters required by the channel controllers that indicate a selection between a normal DMA transfer mode and in an automatic array chaining mode;
- a channel condition register indicating an operating condition of the channel;
- a base transfer counting register indicating a number of descriptors in the channel, when the controller is operating in the array chaining mode;
- a memory transfer counting register indicating a length of the transfer of a data packet;
- a base address register indicating a location in the memory (SRAM) of each descriptor when the array chaining mode is employed;
- a memory address register containing an address of a location of the memory for a predetermined data packet;
- a master condition machine of the first channel controller managing operations including searching for information in the descriptors when the array chaining mode is employed; and
- a master condition machine of the second channel for managing operations, including searching for information in the descriptors when in the array chaining mode.

* * * * *